(12) United States Patent  (10) Patent No.: US 8,862,458 B2
Freising et al.  (45) Date of Patent: Oct. 14, 2014

(54) NATURAL LANGUAGE INTERFACE

(75) Inventors: Uwe Freising, Frankenthal (DE); Marit Rams, Muehlhausen (DE)

(73) Assignee: SAP AG, Walldorf (DE)

( * ) Notice: Subject to any disclaimer, the term of this patent is extended or adjusted under 35 U.S.C. 154(b) by 248 days.

(21) Appl. No.: 12/956,448

(22) Filed: Nov. 30, 2010

(65) Prior Publication Data

US 2012/0136649 A1  May 31, 2012

(51) Int. Cl.
*G06F 17/27* (2006.01)
*G06F 17/30* (2006.01)

(52) U.S. Cl.
CPC ...... *G06F 17/30663* (2013.01); *G06F 17/2785* (2013.01)
USPC ............................................. 704/9; 707/715

(58) Field of Classification Search
CPC .......... G06F 17/2785; G06F 17/30672; G06F 17/30663
USPC ............................................................ 704/9
See application file for complete search history.

(56) References Cited

U.S. PATENT DOCUMENTS

| | | | | |
|---|---|---|---|---|
| 4,849,898 | A * | 7/1989 | Adi ........................................ | 1/1 |
| 6,363,374 | B1 * | 3/2002 | Corston-Oliver et al. ............ | 1/1 |
| 6,910,003 | B1 * | 6/2005 | Arnold et al. ..................... | 704/4 |
| 6,941,295 | B2 * | 9/2005 | Nakamura et al. ............ | 707/769 |
| 7,403,890 | B2 * | 7/2008 | Roushar ............................ | 704/9 |
| 7,536,397 | B2 * | 5/2009 | Corston-Oliver et al. ............ | 1/1 |
| 7,680,782 | B2 * | 3/2010 | Chen et al. ............. | 707/999.004 |
| 7,941,415 | B2 * | 5/2011 | Gile et al. ..................... | 707/705 |
| 8,046,372 | B1 * | 10/2011 | Thirumalai et al. .......... | 707/749 |
| 8,156,125 | B2 * | 4/2012 | Annau et al. .................. | 707/746 |
| 8,489,628 | B2 * | 7/2013 | Patterson ..................... | 707/767 |
| 2003/0069880 | A1 * | 4/2003 | Harrison et al. ................. | 707/3 |
| 2003/0233224 | A1 * | 12/2003 | Marchisio et al. ................ | 704/4 |
| 2004/0122657 | A1 * | 6/2004 | Brants et al. ...................... | 704/9 |
| 2007/0106496 | A1 * | 5/2007 | Ramsey et al. .................... | 704/9 |
| 2008/0263019 | A1 * | 10/2008 | Harrison et al. ................... | 707/4 |
| 2009/0112828 | A1 * | 4/2009 | Rozenblatt ........................ | 707/4 |
| 2010/0023514 | A1 * | 1/2010 | Parikh ............... | 707/6 |
| 2011/0282651 | A1 * | 11/2011 | Nygaard et al. .................. | 704/9 |
| 2011/0301941 | A1 * | 12/2011 | De Vocht .......................... | 704/9 |
| 2012/0078895 | A1 * | 3/2012 | Chu-Carroll et al. ......... | 707/728 |
| 2012/0203752 | A1 * | 8/2012 | Ha-Thuc et al. .............. | 707/706 |
| 2012/0310630 | A1 * | 12/2012 | Parikh .............................. | 704/9 |

* cited by examiner

*Primary Examiner* — David Hudspeth
*Assistant Examiner* — Timothy Nguyen
(74) *Attorney, Agent, or Firm* — Fish & Richardson P.C.

(57) ABSTRACT

The present disclosure involves systems, software, and computer implemented methods for providing a natural language interface for searching a database. One process includes operations for receiving a natural language query. One or more tokens contained in the natural language query are identified. A set of sentences is generated based on the identified tokens, each sentence representing a possible logical interpretation of the natural language query and including a combination of at least one of the identified tokens. At least one sentence in the set of sentences is selected for searching a database based on the identified tokens.

22 Claims, 4 Drawing Sheets

NATURAL LANGUAGE INTERFACE

TECHNICAL FIELD

The present disclosure relates to software, computer systems, and computer implemented methods for providing a natural language interface for searching databases.

BACKGROUND

Databases containing large amounts of data can be managed and searched using database languages such as Structured Query Language (SQL). In some instances, traditional interfaces can be used to access data stored in a database. Traditional interfaces can restrict users to a formal syntax, however, and may require users to have knowledge of database language syntax or the underlying structure of data stored in the database. Some database interfaces may allow a user to search a database using natural words. The database interfaces with natural language features, however, may require maintenance of an ontology to facilitate searches of the database using natural words. In some implementations, a large-scale ontology requiring user maintenance and administration is needed to utilize natural word searches of mass data in large databases. The resources required to maintain a large-scale ontology and lengthy search times associated with large databases may be prohibitive of natural word searches on a database.

SUMMARY

The present disclosure describes techniques for providing a natural language interface for searching a database. A computer program product is encoded on a tangible storage medium, where the product comprises computer readable instructions for causing one or more processors to perform operations. These operations can include receiving a natural language query. One or more tokens contained in the natural language query are identified. A set of sentences is generated based on the identified tokens, each sentence representing a possible logical interpretation of the natural language query and including a combination of at least one of the identified tokens. At least one sentence in the set of sentences is selected for searching a database based on the identified tokens.

In one implementation, selecting the sentence includes eliminating an invalid sentence from the set of sentences based on a type of a token in the invalid sentence before selection of the sentence. Sentences containing tokens associated with a stop word, a question word, or a column name found in the database can be eliminated from the set of sentences, wherein stop words are words without a semantic value and question words are words indicating that a sentence associated with a question word is a question. Selecting the sentence can also include ranking sentences in the set of sentences based on relevancy of each sentence to a probable interpretation of the natural language query. In this instance, the relevancy of each sentence can be determined based on a number of words contained in a phrase token and a number of instances that the phrase token is located in the database.

In certain implementations, the operations can further include building a query to search the database based on the selected sentence, wherein the query is structured in a format compatible with the database, and executing the query against the database. The operations can also include determining that the natural language query will not be answered by results from a query based on the selected sentence and identifying an intermediate value used to answer the natural language query. A query is generated based on the selected sentence to execute against the database, the query including a nested query to determine the intermediate value. Still further, in some implementations, the database is implemented as an in-memory database and a text search engine of the in-memory database is used to execute the search against the database.

While generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
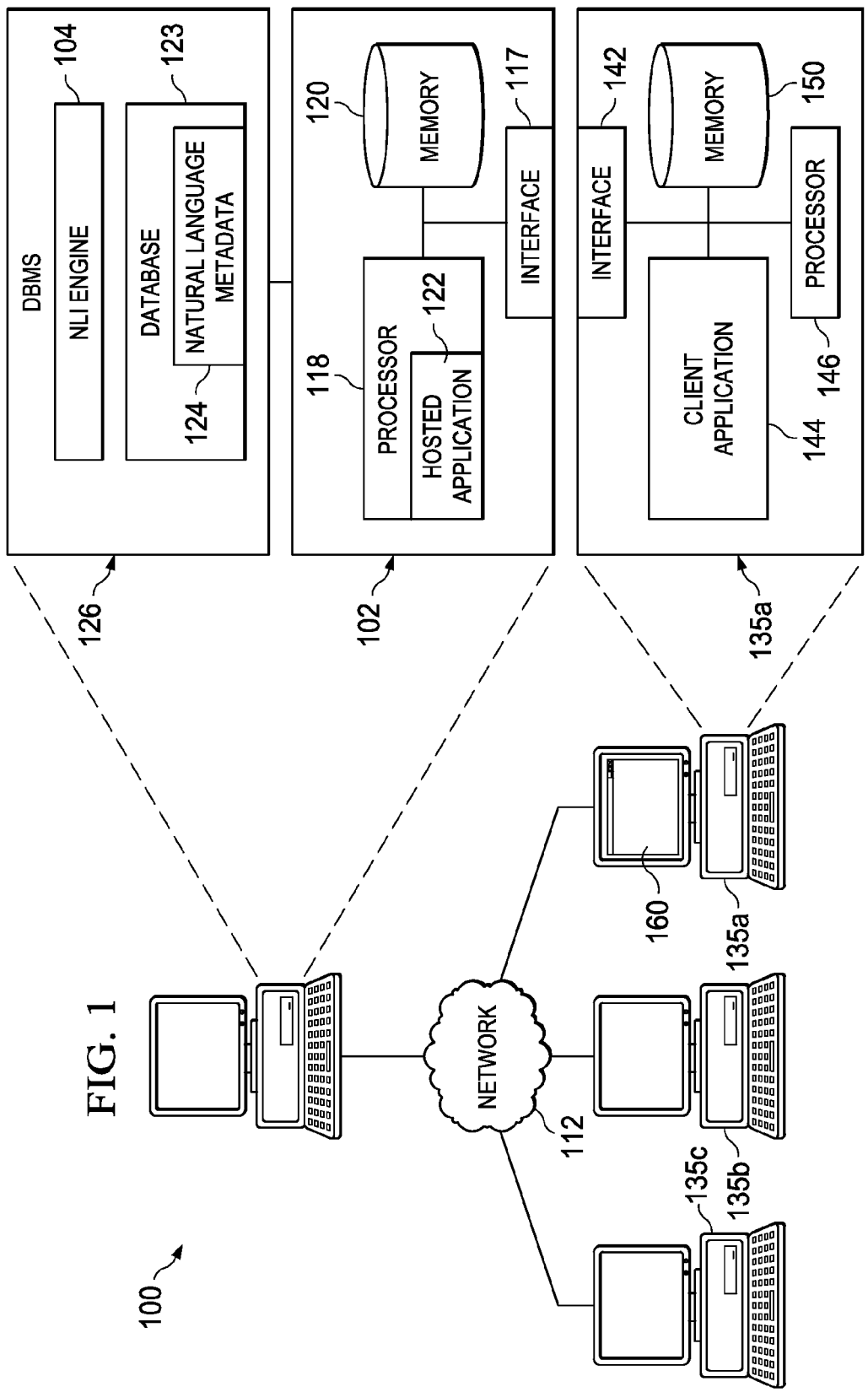
FIG. 1 illustrates an example environment for providing a natural language interface for searching databases.

This disclosure generally describes computer systems, software, and computer implemented methods for providing a natural language interface for searching databases. Users can access databases using natural language queries through the natural language interface. A natural language query can be analyzed by a processor and converted into an appropriate syntax for execution against a database. The natural language interface can be integrated with a database management system with in-memory relational engines, which execute the searches against the database. The queries can be directed to search one business object, and tokens within the query can be mapped to database columns without the need for a large-scale ontology to search the database. Accordingly, a natural language interface can be provided to efficiently execute natural language searches on a database.

In some implementations, a natural language search is restricted to one business object to create a specific user domain for the query. Particular terms in the query are mapped to certain columns in the database structure. Internal functions within the search engine can perform the mapping and search all database columns of a given domain for all terms in the natural language query. The internal functions can perform lookup of terms in a database dictionary and are faster than typical search queries due to integration into the database. Depending on the number of hits in the database columns, the probability of a correct mapping is calculated, and metadata associated with particular terms can be generated to facilitate searches on the database. The search functions and processors for the natural language interface can be tightly integrated with in-memory relational engines of a database management system to execute searches on the database. In some implementations, the in-memory relational engines are also responsible for creating and maintaining data inside the column store of the database.

One potential benefit of the natural language interface is efficient handling and searching of mass data. The natural language interface can be integrated with a database management system for access to database tables. The integration of the natural language interface with the database management system allows for transparent access to structured business data using natural language searches. Accordingly, the natural language search functions can be integrated into general business scenarios and allow for searching of standard business objects. The close integration of the natural language interface allows for reduced search times on large amounts of mass data and increased accuracy in search results. Further, the capability for natural language searches permits users to search a database without knowledge of formal database language syntax or without knowledge of the underlying database structure. Still further, the database management system functions can be used to generate semantic metadata to replace a full-scale semantic ontology. Natural language searching without the full-scale ontology can avoid the resources, manpower, and time required to maintain the ontology. Searches can also be performed in less time if the semantic ontology can be avoided.

Turning to the illustrated example, FIG. 1 illustrates an example environment 100 for providing a natural language interface for searching databases. The illustrated environment 100 can include or be communicably coupled with one or more clients 135 or servers 102, at least some of which communicate across network 112. In general, environment 100 depicts an example configuration of a system capable of providing a natural language interface for efficiently searching data in a database. In some implementations, the natural language interface of the present disclosure can be implemented in connection with a database management system 126 coupled to a server, such as an application server, accessible to other applications or to users through a network 112. The database management system 126 can also be implemented without connection to an application server and can be accessed directly, either locally or remotely from a client.

The database management system 126 allows different user application programs to easily access the same database. Different interfaces can be used to access the database, including Java Database Connectivity (JDBC), Open Database Connectivity (ODBC), or Python DB-API, for example. In some implementations, the database management system 126 can be implemented on a database server. The database server can be any computer configured to store one or more databases and operable to execute database management software. The software can include instructions for controlling the organization, storage, management, and retrieval of data in a database. In some instances, the database server can include memory and RAID disk arrays used for data storage. Hardware database accelerators, connected to one or more servers via a high-speed channel, can also be used in large volume transaction processing environments. The database management system 126 can accept requests for data from an application program and execute instructions to transfer the appropriate data. Queries and responses can be submitted and received in connection with the database management system 126 according to a format that conforms to one or more applicable database protocols.

The database management system 126 software can be executed by one or more processors. A processor may be a central processing unit (CPU), a blade, an application specific integrated circuit (ASIC), a field-programmable gate array (FPGA), or another suitable component. Generally, the processor executes instructions and manipulates data to perform the operations of the database management system 126. Regardless of the particular implementation, "software" may include computer-readable instructions, firmware, wired or programmed hardware, or any combination thereof on a tangible, non-transitory, medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

Specifically, a processor associated with database management system 126 executes the functionality required to receive and respond to requests from a client for data managed by the database management system 126. The client, in this instance, can be an application, a user, or application server, for example. In certain implementations, the database management system 126 is associated with a natural language interface engine that can provide seamless integration of natural language search functionality with standard business scenarios. The natural language interface can allow a user to enter natural language searches without knowledge of a formal database language syntax or the underlying database table structure.

In certain implementations, the database management system 126 is implemented in connection with a server 102, although server 102 is not a required component of the present disclosure. Server 102 is any server that stores one or more hosted applications 122, where at least a portion of the hosted applications are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications or business applications associated with clients 135 of environment 100 and responding to the received requests by processing said requests in the associated hosted application 122, and sending the appropriate response from the hosted application 122 back to the requesting client application. The server 102 may also receive requests and respond to requests from other components on network 112. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a single database server housing the database management system 126, environment 100 can be implemented using one or more database servers, as well as computers other than servers, including a server pool. Indeed, database management system 126, server 102, and client 135 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated database management system 126, server 102, and client 135 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, and one or more hosted applications 122. The interface 117 is used by the server 102 for communicating with other systems in a client-server or other distributed environment (including within environment 100) connected to the network 112 (e.g., clients 135, as well as other systems or applications communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

Generally, the database management system 126 or server 102 may be communicably coupled with a network 112 that facilitates wireless or wireline communications between the components of the environment 100 (i.e., between the database management system 126 or server 102 and clients 135), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102.

Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100.

The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135*a-c* and their associated client applications 144 or from other servers or components through a network 112.

The database management system 126 can manage the creation, maintenance, use, and access of one or more databases. In the illustrated example, the database management system 126 can be implemented in connection with in-memory computing engines. Within the database management system 126 are additional in-memory components such as a natural language interface (NLI) engine 104 that provides interfaces, modules, services, or metadata definitions that enable the database management system to execute natural language searches on a database or repository of data. The data searched by the NLI engine 104 can be data stored in a database 123 in memory, for example, or may be stored in a repository external to the database management system 126. Although the NLI engine 104 is depicted in FIG. 1 as being a component of the database management system 126, the NLI engine 104 can also be implemented as a stand-alone application or module.

The NLI engine 104 may provide services for receiving a natural language query from a user and generating a database query in a format with the appropriate syntax for searching a particular database. For example, a user without knowledge of a database language or the database structure may enter a search query using natural words and the NLI engine 104 can convert the natural language search into an SQL query on the database. In some implementations, the data searched by the NLI engine 104 is structured data. Further, NLI engine 104 can be executed on a server associated with a database management system. In other words, NLI engine 104 can be implemented as one of a plurality of in-memory engines associated with a database. The in-memory engines can be used for intelligent searching, classification, and aggregation of large collections of documents as well as searching and aggregating business objects. In some implementations, the in-memory engines can be integrated into enterprise solutions, such as to enhance the performance of online analytical processing.

As used in the present disclosure, the term "memory" may include any memory or database module and may take the form of volatile or non-volatile memory including, without limitation, magnetic media, optical media, random access memory (RAM), read-only memory (ROM), removable media, or any other suitable local or remote memory component. The memory may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the database management system 126 or server 102.

Memory associated with the database management system 126 can store data objects organized in a data structure such as a database 123. The database 123 can include both structured data, such as business documents and business objects, and unstructured data, such as attachments and files, for example. The data in database 123 can be organized according to particular database tables, layouts, columns, and hierarchies, and can be searched by NLI engine 104. Further, the database 123 can be implemented as an in-memory database in a system's main memory. The in-memory database implementation allows efficient storage of data in a system's main memory to allow seamless access to and propagation of data in real-time. Still further, the database 123 can reside on a server external to database management system 126 or in a dedicated storage repository.

In some implementations, memory associated with database management system 126 can also store natural language metadata 124. Natural language metadata 124 can include metadata associated with business objects, terms, and columns within a database. The NLI engine 104 can define the natural language metadata 124 based on analysis of items within the database 123. In some instances, the NLI engine 104 can also access the natural language metadata 124 to identify particular business objects in the database 123 for searching, map natural language terms in a query to specific columns or fields in the database 123, convert natural language search queries into a suitable database language format, and organize and present results to the user based on an estimated usefulness of the search results in response to a query. The natural language metadata 124 can be used by NLI engine 104 without maintenance of a semantic ontology for the terms in a database 123.

In some implementations, the illustrated environment of FIG. 1 can also include one or more clients 135. Each client 135 may be any computing device operable to connect to or communicate with at least the server 102, the database management system 126, and/or via the network 112 using a wireline or wireless connection. Further, as illustrated in FIG. 1, client 135*a* includes a processor 146, an interface 142, a graphical user interface (GUI) 160*b*, a client application 144, and a memory 150. In general, client 135*a* comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes client 135*a*, alternative implementations of environment 100 may include multiple clients communicably coupled to the database management system 126 or server 102, or any other number of clients suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. The term "client" may also refer to any computer, application, or device, such as a mobile device, that is communicably coupled to one or more servers through a network 112. Moreover, while each client 135 is described in terms of being used by a single user, this disclosure contemplates that many users may use one computer, or that one user may use multiple computers.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, only a database management system 126 is required to implement a natural language interface without the need for server 102. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
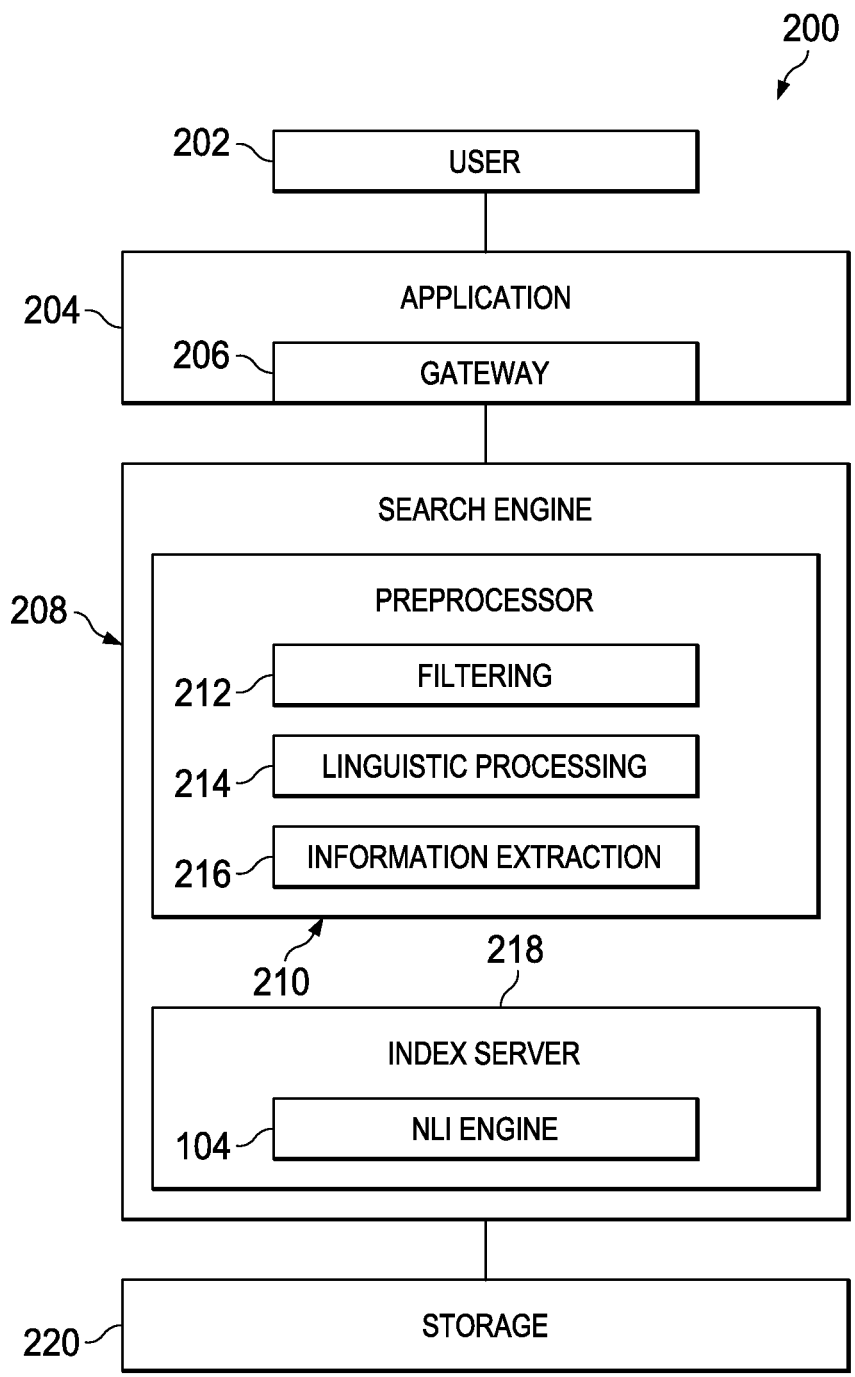
FIG. 2 illustrates an example architecture implementing natural language searches of a database using an appropriate system, such as the system described in FIG. 1.

FIG. 2 illustrates an overview of an example architecture 200 for implementing natural language searches of a database. As depicted in FIG. 2, several layers can be included in a natural language implementation, such as a user layer 202, an application layer 204, a search engine layer 208, and a storage layer 220. In some instances, user 202 can use application 204 in connection with a business scenario requiring searching of data in an in-memory database. Application 204 can be a client application or hosted application, for example. In certain implementations, application 204 is coupled to a gateway 206 that provides access to services provided over a network. For example, a search engine 208 can be provided as a service over a network for remote access, the search engine 208 consisting of a plurality of servers and processes integrated with a database 220 to facilitate efficient searching of the in-memory database.

The search engine 208 can consist of multiple components. In some implementations, a preprocessor 210 is included as a component of search engine 208. Preprocessor 210 can include various components for performing search related tasks such as filtering 212, linguistic processing 214, and information extraction 216. Preprocessor 210 can also perform specific tasks for analysis of queries, syntax, and database terms. For example, certain tasks performed by the preprocessor 210 such as tokenization, stemming, and tagging of query terms, can be utilized by other components of the search engine 208, such as NLI engine 104, as preliminary analysis for further processing related to natural language searches.

An index server 218 associated with search engine 208 can provide the various components needed to access and search a database after preliminary semantic analysis has been performed. For example, text search, text mining, and attribute engines in index server 218 can be used to generate queries for text searching and mining of data stored in a database. In some implementations, natural language queries can also be supported in connection with NLI engine 104. NLI engine 104 can receive queries from a user in natural language format, determine a business object in the database to search based on terms in the query, and generate a query in an appropriate format for execution against a database. Storage 220 can be a disk repository for storing data used by search engine. Although the search engine 208 can be configured to search an in-memory database instead of data stored in a disk repository, storage 220 can be used to store necessary data for loading of the in-memory database or for backup purposes.

Figure 3:
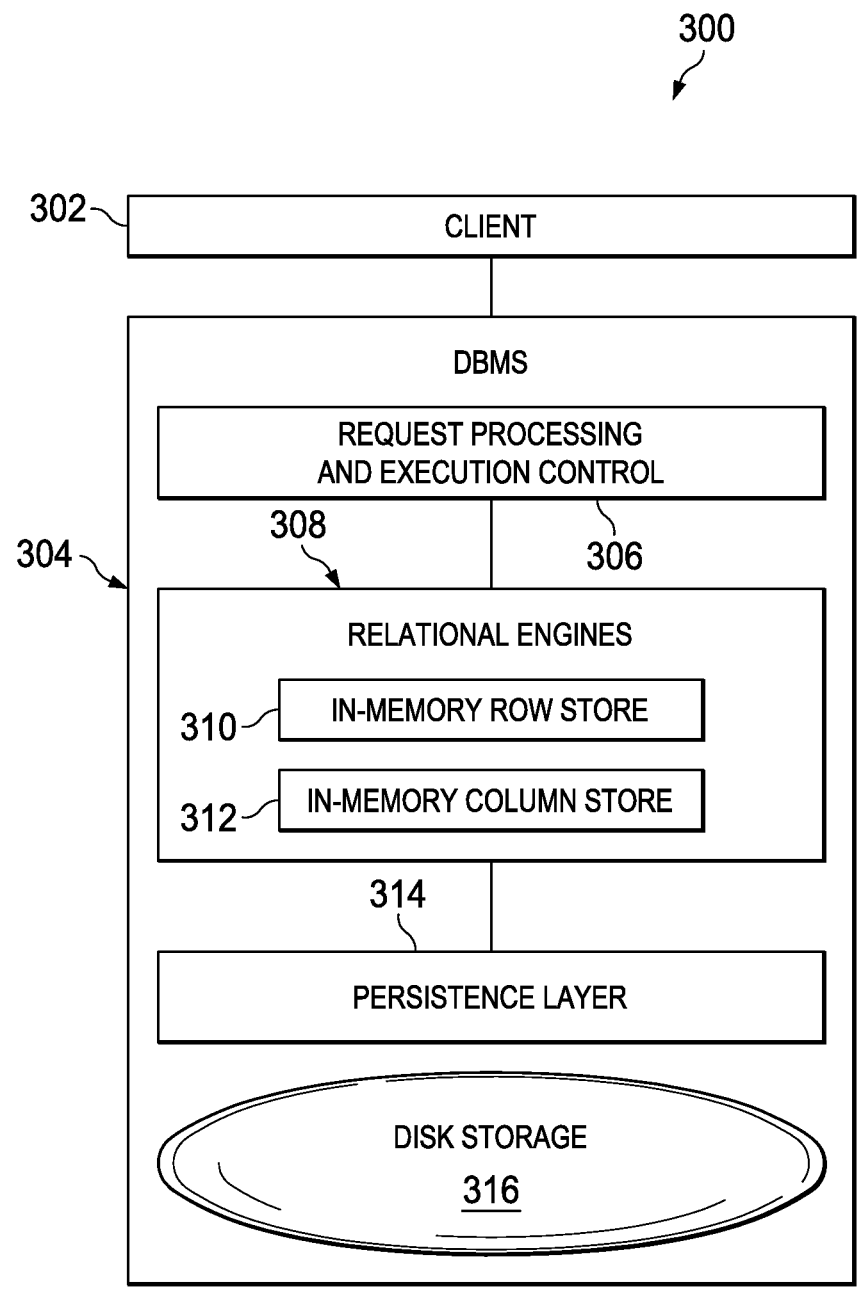
FIG. 3 illustrates another example architecture implementing natural language searches of a database using an appropriate system, such as the system described in FIG. 1.

FIG. 3 illustrates an overview of an architecture 300 for implementing natural language searches of a database using relational engines in a database management system. In some implementations, the NLI engine 104 can be fully integrated into a database management system (DBMS) 304 as an in-memory relational engine. The in-memory implementation of the NLI engine allows for fast searching of data in a database. In FIG. 3, the in-memory column store engine 312 corresponds to the NLI engine 104 and performs the functions for providing a natural language interface.

A client 302 is connected to the DBMS 304 to access the database managed by DBMS 304. Here, the client 302 can be any application, analytics technology, server, or other component needing to execute queries against a database. For example, the client 302 can be an application server, a hosted application, or an application executed on a mobile device. A request processing and execution control module 306 in DBMS 304 can receive and process search requests. Relational engines 308, such as in-memory row store 310 and in-memory column store 312, can be used to access and search the data in the actual repositories. In particular, the in-memory column store 312 can be used to perform functions needed to provide a natural language interface for searching a data contained in the in-memory column store. The disk storage 316 may be associated with a persistence layer 314 that maintains persistence for data in disk storage 316.

Figure 4:
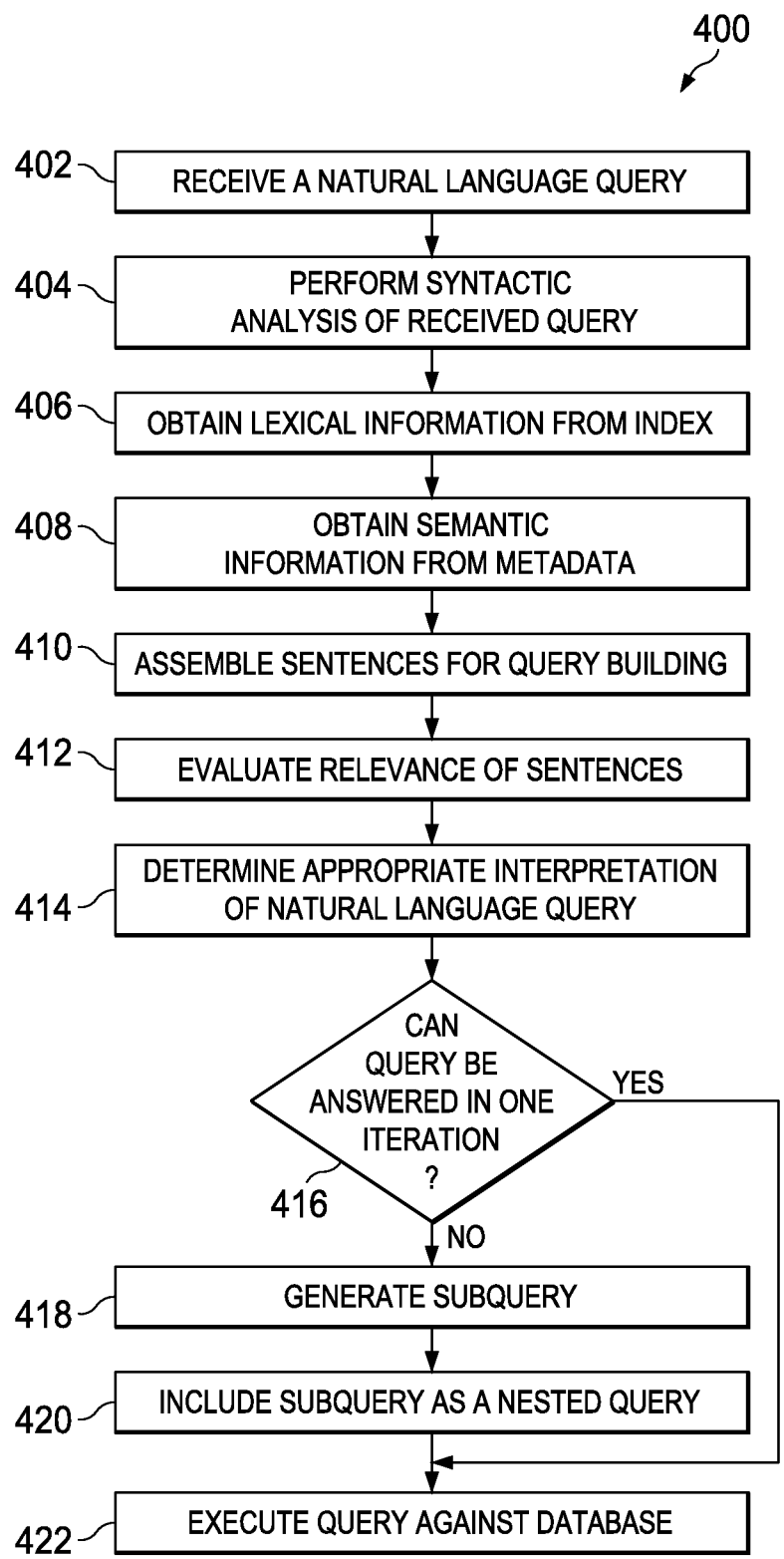
FIG. 4 illustrates a flowchart of an example process for implementing a natural language interface for searching a database using an appropriate system, such as the system described in FIG. 1.

FIG. 4 depicts a flowchart of an example process 400 for implementing a natural language interface for searching a database. A natural language query is received at 402. The natural language interface allows users to search a database without knowledge of syntax of a particular database language or understanding of an underlying database table layout. In some implementations, however, a received query can also include additional parameters such as a particular business object or index in the database to be searched, the language to be used in the database query, and number of allowed search results. Next, syntactic analysis of the received query is performed at 404. In some implementations, the syntactic analysis is performed using a preprocessor 210 associated with a search engine 208 such as depicted in FIG. 2. The analysis performed by the preprocessor 210 includes tokenization, stemming, and tagging of words included in the natural language query. Tokenization of words can involve determining individual words, phrases, symbols, or other elements from a stream of text, with each element being a token consisting of a string of one or more characters and storing the tokens in a token object. In some natural languages, tokens are frequently determined based on spaces separating different words in a query. The preprocessor 210 can, however, also handle natural languages in which spaces are not used to separate words.

Further, possible phrases can be created from the tokens for inclusion in a token object. In some instances, all possible phrases are included in the token object. For some tokens, certain words can be grouped together in phrases to form a phrase token. To determine the appropriate words to group together as a phrase, searches can be performed on natural language metadata 124 associated with a database to identify a number of hits associated with each phrase or token. For example, although two words can be grouped together as a phrase, if a search of the natural language metadata 124 yields no results in which the two words are grouped as a phrase, then a token may not be generated for that particular arrangement of words. Additional processing performed by the preprocessor 210 can include stemming of words, which involves determining a word stem associated with a particular word, such as a singular form of a plural word. In some implementations, tokens can also be tagged by preprocessor 210 to indicate attributes associated with the token, such as whether a particular token is a noun, preposition, verb, or other part of speech associated with a word.

Lexical information is obtained from an index of metadata 124 associated with search engine 208 at 406. In some implementations, the lexical information for each token can be identified by searching all columns in a particular index that have been enabled for natural language searching. In other words, all columns in a particular business object in the in-memory database associated with search engine 210 are searched to determine if a particular value is found in the database for each token. In certain instances, the lexical information is obtained from natural language metadata 124. If the database is implemented as an in-memory solution, all columns in the business object can be feasibly searched because the search engine 208 can perform fast searches on an in-memory database in contrast to searching of typical disk repositories. Further, in some instances, only columns identified as enabled for natural language searching are searched. For example, a column with Boolean values would generally not be marked for natural language searching as the Boolean values in the column would have no meaning to a natural language query. The natural language interface enabled columns are specified in the metadata. If a value for a token is found in a column, the token is marked as having a potential attribute value.

Semantic information can be obtained from metadata associated with particular tokens at 408. Metadata can be defined and maintained, and semantic analysis can be performed for each token in the query to determine a category for each token. For example, semantic analysis can involve determining whether a token is a stop word, operator, attribute name, attribute value, question word, plain number, or measured value. In some implementations, attribute names are stored in the metadata, and attribute values are tokens that were found in the database. Stop words can be words that generally do not have a semantic value such as prepositions or articles, and question words can be words that are included in a query to indicate that the query is a question. In some instances, the semantic analysis can assign only one category for a particular token while in other instances, more than one category is assigned to a token, such as for value tokens. Based on the semantic analysis, certain tokens may not be included in a query to execute against a database. For example, if a particular token, such as "phone number," is a description of an attribute that appears as a column heading, the phrase "phone number" is set as a result column. Similarly, if a token is categorized during semantic analysis as a question word such as "what," the term "what" is not searched because it merely indicates that the natural language query is a question and is not associated with a particular value stored in the in-memory database. Accordingly, an example natural language query "what's the phone number of John Miller" could result in an actual database query resembling the phrase, "select phone number from table where last name='Miller' and first name='John.'"

One or more sentences can be assembled for query building based on semantic analysis of the tokens at 410. Each sentence can consist of a combination of one or more tokens of the input query arranged in a manner representing one possible interpretation of the initial natural language query. When a database query is eventually executed against the database, the query can be built based on a selected sentence (or interpretation). During assembly of logical sentences, some tokens that are not associated with semantic values, such as stop words, question words, or column names, are not included in the assembled sentences. In some instances, tokens in the original query can be searched within the metadata to determine whether any of the tokens are also column names. Additionally, logical operators between attribute names can also be deleted from the sentences. The remaining tokens, however, may be included in the assembled sentences, and possible combinations of the remaining tokens may be combined as different sentences. In some instances, every possible combination of remaining tokens can be generated as different sentences while in other instances, only some of the remaining tokens are combined as sentences. In one example, a natural language query received from a user can comprise the input sentence: "Show me all new employees of John Miller between 2001 and 2003." Sentence assembly can, for instance, generate the following sentences based on the tokens identified in the input sentence:

inputSentence="Show me all employees of John Miller between 2001 and 2003."
Start sentence assembling
new sentence: employees|John Miller|between|2001|and|2003|
new sentence: employees|John Miller|between|2001|2003|
new sentence: employees|John Miller|between|and|2003|
new sentence: employees|John Miller|between|2003|
new sentence: employees|John Miller|2001|and|2003|
new sentence: employees|John Miller|2001|2003|
new sentence: employees|John Miller|and|2003|
new sentence: employees|John Miller|2003|
new sentence: employees|between|2001|and|2003|
new sentence: employees|between|2001|2003|
new sentence: employees|between|and|2003|
new sentence: employees|between|2003|
new sentence: employees|2001|and|2003|
new sentence: employees|2001|2003|
new sentence: employees|and|2003|
new sentence: employees|2003|
new sentence: John Miller|between|2001|and|2003|
new sentence: John Miller|between|2001|2003|
new sentence: John Miller|between|and|2003|
new sentence: John Miller|between|2003|
new sentence: John Miller|2001|and|2003|
new sentence: John Miller|2001|2003|
new sentence: John Miller|and|2003|
new sentence: John Miller|2003|
new sentence: between|2001|and|2003|
new sentence: between|2001|2003|
new sentence: between|and|2003|
new sentence: between|2003|
new sentence: 2001|and|2003|
new sentence: 2001|2003|
new sentence: and|2003|
new sentence: 2003|

As seen in the example sentences above, tokens from the original input sentence are grouped in different combinations to form different sentences. Further, as depicted above, tokens can include single word tokens as well as phrases.

After the sentences are assembled, they may be evaluated for relevance with respect to the requested data at 412. In some implementations, the sentences can be evaluated for relevance in order to determine sentences that require further processing or for ranking the sentences to determine the appropriate interpretation of the natural language query in the query builder. Different algorithms can be used to rate the sentences. In general, the relevance of a particular sentence can be rated based on the likelihood that a particular phrase or interpretation of a sentence was intended by the user. To determine the likelihood that a particular interpretation was intended by the user, the database can be searched for phrases found in a sentence, and the number of search results yielding a phrase can result in higher ratings for the particular phrase. Further, phrase length can be factored into sentence ratings, with longer phrases indicating higher relevance due to the likelihood that a user intended to search the database for a lengthy phrase if the phrase is already found in the database. Still further, certain combinations of tokens found in a sentence can be assigned higher ratings. For example, if a particular sentence contains a "column name"/"operator"/"value" token combination, such as "revenue is greater than 1000," that sentence can be assigned a higher rating because the "column name"/"operator"/"value" combination may be a frequently used combination of tokens for queries.

In certain implementations, adjacent tokens in a sentence can be identified as "siblings" and assigned a higher rating. Some tokens in a sentence may be an attribute value, such as a person's name (e.g., John). If two tokens that are attribute values are adjacent to one another, the NLI engine 104 can determine whether the tokens should be identified as siblings, which are defined pairs of attribute names that belong together. An example of a sibling pair are the attributes "first name" and "last name." If two attribute values are identified as siblings, the pair of tokens are ranked higher. Identification of a sibling pair can also result in elimination of unlikely combinations such as a "last name" paired with another "last name." Accordingly, the set of potential interpretations can be further reduced semantically by identifying logical siblings in a sentence.

Moreover, distance checking algorithms can be used to further rank sentences. In some instances, a natural language query can contain multiple possible attribute values associated with the same attribute name. For example, an input sentence may be received as a query to search for "phone number of Austin in city Dallas." In the received sentence, "city" can be an attribute name. In other words, one or more database columns may be named "city" because the column may list values of the attribute "city." Returning to the example query, the terms "Austin" and "Dallas" are attribute values which may be associated with the attribute name "city" because both Austin and Dallas are cities. In the present example, the term "Austin" can also be a person's last name, and so can also be associated with the attribute name "last name." The distance check algorithm can be applied in this instance to determine which of the two attribute values in the sentence should be associated with the attribute name in the sentence. In the original natural language query, "Austin" is located further from "city" than "Dallas" in terms of intervening words. Accordingly, the distance check algorithm may assign a higher rating to a sentence that associates "Dallas" with "city."

Each token in a sentence can be assigned a rating based on the parameters described above, and the ratings for each token in a sentence can be totaled to give the overall relevance of the sentence. The algorithms described above are merely examples of determining relevance of sentences. Other algorithms for rating relevance of the sentences can also be used and are within the scope of the present disclosure.

In some implementations, three different rankings can be used in the natural language interface: sentence ranking, token ranking and interpretation ranking Sentence can be rated by the following formula:

$$\Sigma(\text{phrase length} + (\text{phrase length} * \text{phrase length})/100).$$

Various parameters can be used to determine whether a particular sentence should get a lower rating. For example, if a phrase does not include at least one token that is tagged as either noun, proper name or number, it is downgraded to 0.01. Further, if an attribute value phrase follows on an attribute name and begins with a preposition, then the preposition is not counted (e.g., company in Walldorf). If an attribute value phrase is followed by an attribute name and ends with a preposition, then the preposition is not counted (e.g., Miller in building 3).

The second kind of ranking is the token ranking Tokens that are attribute values can be rated by the formula:

$$\ln(\text{hits in index} + 1.0).$$

The rating can further be boosted by sibling detection, distance check or by a combination of column name, comparison operator and attribute value. (e.g., price greater than $1).

A third type of ranking is the interpretation ranking. Interpretations are sentences which were marked as valid and which have a sentence ranking meeting a threshold. In some implementations, the sum of the token ratings of the tokens which are part of the sentence is calculated. Then, this result is combined with the sentence ranking. For example, the formula used for the interpretation ranking can be:

$$\ln(\Sigma(\text{token ratings})) + 2*(\ln(\text{sentence rating})).$$

Afterwards, the interpretations are sorted accordingly.

Based on the relevance of the different sentences, an appropriate interpretation of the natural language query is determined at 414 by selecting one or more of the possible sentences based on ranking. In some implementations, the list of possible sentences can be presented to a user to allow the user to select a sentence as the correct query to execute against the database. Alternatively, the sentence selected as the interpretation that is most likely to be correct is based on the ranking of the sentences as determined by the relevancy algorithms described above. The selected sentence, whether selected manually or automatically, can then be executed against the database. Search engine 208 can be configured to generate a query with an appropriate format and syntax based on the selected sentence to search a particular business object in a database. Standard search results can then be returned to the user.

In some implementations, an evaluation is performed to determine whether the query can be answered in one iteration at 416. By searching a database using only tokens associated with semantic values, a single iteration of the query can return results that satisfy the query, and the query is executed against the database at 422. There may be instances, however, when a first execution of the query against the database will not yield an appropriate result. For example, a received natural language query may be "who shares an office with Anton Maier?" The NLI engine 104 may recognize "office" as a requested column name and "Anton" and "Maier" as values associated with the column name. The result of a query based on this interpretation will be a room number associated with Anton Maier. The user, however, did not intend to ask for the specific room number of Anton Maier. Here, the room number is only an intermediate result. To address whether a query can be satisfactorily answered in one iteration of searching the database, question words can be assigned to categories. In the present example, the question word "who" is linked to the category "person." Since "office" is not assigned to the same category, the query is not answered in the first iteration. Instead, the "office of Anton Maier" can be used as a subquery to first obtain the room number of the office, which can then be used to determine all persons having the same room number.

Accordingly, a subquery is generated at 418 if the query cannot be answered in one iteration. The subquery can be included as a nested query within the query that will be executed against the database at 420. In the present example, the nested query is intended to determine a particular room number associated with Anton Maier, and the room number can then be used to obtain an answer in response to the user's question. Accordingly, the columns belonging to the category "person" are selected for searching because the question word "who" in the original natural language query is associated with this category in the metadata, and a query requesting persons having the office number associated with Anton Maier is executed against the database. The result is a list of people having the same room number as Anton Maier. In some implementations, the query and associated nested queries are presented to a user to allow the user to determine whether to execute the query against the database. Further, a list of queries ranked according to the relevancy algorithms described above, including queries with nested queries, can be presented to a user for the user's selection of one or more queries to search the database. The selected sentence, whether selected manually or automatically, can then be executed against the database at 422.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. For example, semantic reduction of possible interpretations of a natural language query can involve removing particular tokens from consideration before generating possible sentences. Alternatively, a set of sentences can first be generated before removing possible sentences based on deleted tokens. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for providing a natural language interface for searching a database, the method comprising the following steps:
   receiving a natural language query;
   identifying one or more tokens contained in the natural language query;
   generating a set of sentences based on the identified tokens, each sentence representing a possible logical interpretation of the natural language query and including a combination of at least one of the identified tokens;

selecting at least one sentence in the set of sentences for searching the database based on an interpretation ranking comprising a sentence ranking and a token ranking, each of the sentence ranking, the token ranking, and the interpretation ranking based at least in part on the identified tokens, where:

the sentence ranking is determined with a sentence ranking formula defined at least in part by a phrase length for each of the sentences in the set of sentences, the token ranking is determined with a token ranking formula defined at least in part by lexical information obtained from an index of metadata, the token ranking formula defined by: ln(hits in index+1.0), where hits in index comprises a number of times that a particular token appears in the index of metadata and the logarithm is applied to the set of sentences, and the interpretation ranking is determined with an interpretation ranking formula defined at least in part by a summation of the sentence ranking and the token ranking that is performed over the set of sentences, the interpretation ranking formula defined by: ln(Σ(token ranking))+2*(ln(sentence ranking)), where the summation is performed over the set of sentences;

building a database-compatible query to search the database based on the at least one sentence, the database comprising a relational database that comprises a plurality of columns; and executing the query against the database by mapping the sentence to at least one of the plurality of columns.

2. The method of claim 1, wherein selecting the at least one sentence includes eliminating an invalid sentence from the set of sentences based on a type of a token in the invalid sentence before selection of the at least one sentence.

3. The method of claim 2, wherein sentences containing tokens associated with a stop word, a question word, or a column name found in the database are eliminated from the set of sentences, wherein stop words are words without a semantic value and question words are words indicating that a sentence associated with a question word is a question.

4. The method of claim 1, wherein the sentence ranking is based on relevancy of each sentence to a probable interpretation of the natural language query.

5. The method of claim 4, wherein the relevancy of each sentence is determined based on a number of words contained in a phrase token and a number of instances that the phrase token is located in the database.

6. The method of claim 1 further comprising:
determining that the natural language query will not be answered by results from a query based on the selected sentence;
identifying an intermediate value used to answer the natural language query; and
generating a query based on the selected sentence to execute against the database, the query including a nested query to determine the intermediate value.

7. The method of claim 1, wherein the database is implemented as an in-memory database and a text search engine of the in-memory database is used to execute the search against the database.

8. A non-transitory computer program product encoded on a non-transitory, tangible storage medium, the product comprising computer readable instructions for causing one or more processors to perform operations comprising:
receiving a natural language query;
identifying one or more tokens contained in the natural language query;
generating a set of sentences based on the identified tokens, each sentence representing a possible logical interpretation of the natural language query and including a combination of at least one of the identified tokens, where:

the sentence ranking is determined with a sentence ranking formula defined at least in part by a phrase length for each of the sentences in the set of sentences, the token ranking is determined with a token ranking formula defined at least in part by lexical information obtained from an index of metadata, the token ranking formula defined by: ln(hits in index+1.0), where hits in index comprises a number of times that a particular token appears in the index of metadata and the logarithm is applied to the set of sentences, and the interpretation ranking is determined with an interpretation ranking formula defined at least in part by a summation of the sentence ranking and the token ranking that is performed over the set of sentences, the interpretation ranking formula defined by: ln(Σ(token ranking))+2*(ln(sentence ranking)), where the summation is performed over the set of sentences;

selecting at least one sentence in the set of sentences for searching the database based on an interpretation ranking comprising a sentence ranking and a token ranking, each of the sentence ranking, the token ranking, and the interpretation ranking based at least in part on the identified tokens;

building a database-compatible query to search the database based on the at least one sentence, the database comprising a relational database that comprises a plurality of columns; and executing the query against the database by mapping the sentence to at least one of the plurality of columns.

9. The non-transitory computer program product of claim 8, wherein selecting the at least one sentence includes eliminating an invalid sentence from the set of sentences based on a type of a token in the invalid sentence before selection of the at least one sentence.

10. The non-transitory computer program product of claim 9, wherein sentences containing tokens associated with a stop word, a question word, or a column name found in the database are eliminated from the set of sentences, wherein stop words are words without a semantic value and question words are words indicating that a sentence associated with a question word is a question.

11. The non-transitory computer program product of claim 10, wherein the column name is determined based on a search of metadata associated with the database.

12. The non-transitory computer program product of claim 8, wherein the sentence ranking is based on relevancy of each sentence to a probable interpretation of the natural language query.

13. The non-transitory computer program product of claim 12, wherein the relevancy of each sentence is determined based on a number of words contained in a phrase token and a number of instances that the phrase token is located in the database.

14. The non-transitory computer program product of claim 8, wherein the database is implemented as an in-memory database and a text search engine of the in-memory database is used to execute the search against the database.

15. The non-transitory computer program product of claim 8, wherein the operations further comprise:
building a query to search the database based on the at least one sentence, the query structured in a format compatible with the database; and
executing the query against the database.

16. A system, comprising:

memory operable to store data in a database and a natural language interface engine; and one or more processors operable to execute the natural language interface engine to perform operations comprising:

receiving a natural language query;

identifying one or more tokens contained in the natural language query;

generating a set of sentences based on the identified tokens, each sentence representing a possible logical interpretation of the natural language query and including a combination of at least one of the identified tokens;

selecting at least one sentence in the set of sentences for searching the database based on an interpretation ranking comprising a sentence ranking and a token ranking, each of the sentence ranking, the token ranking, and the interpretation ranking based at least in part on the identified tokens, where:

the sentence ranking is determined with a sentence ranking formula defined at least in part by a phrase length for each of the sentences in the set of sentences, the token ranking is determined with a token ranking formula defined at least in part by lexical information obtained from an index of metadata, the token ranking formula defined by: ln(hits in index+1.0), where hits in index comprises a number of times that a particular token appears in the index of metadata and the logarithm is applied to the set of sentences, and the interpretation ranking is determined with an interpretation ranking formula defined at least in part by a summation of the sentence ranking and the token ranking that is performed over the set of sentences, the interpretation ranking formula defined by: $\ln(\Sigma$ (token ranking))$+2*(\ln$(sentence ranking)), where the summation is performed over the set of sentences;

building a database-compatible query to search the database based on the at least one sentence, the database comprising a relational database that comprises a plurality of columns; and executing the query against the database by mapping the sentence to at least one of the plurality of columns.

17. The system of claim 16, wherein selecting the at least one sentence includes eliminating an invalid sentence from the set of sentences based on a type of a token in the invalid sentence before selection of the at least one sentence.

18. The system of claim 17, wherein sentences containing tokens associated with a stop word, a question word, or a column name found in the database are eliminated from the set of sentences, wherein stop words are words without a semantic value and question words are words indicating that a sentence associated with a question word is a question.

19. The system of claim 16, wherein selecting the at least one sentence includes ranking sentences in the set of sentences based on relevancy of each sentence to a probable interpretation of the natural language query.

20. The method of claim 1, wherein the sentence ranking formula comprises:

$\Sigma$(phrase length+(phase length*phrase length)/100), where the summation is performed over the set of sentences.

21. The method of claim 1, wherein the sentence ranking formula is further defined at least in part by a token value coefficient of each of the sentences in the set of sentences.

22. The method of claim 1, wherein the token ranking is adjusted by a token sibling detection.

* * * * *